United States Patent
Nurmi et al.

(10) Patent No.: US 7,754,473 B2
(45) Date of Patent: Jul. 13, 2010

(54) TEMPERATURE CONTROL OF REACTION VESSEL, SYSTEM WITH REACTION VESSEL, SOFTWARE PRODUCT FOR SYSTEM AND USE OF SYSTEM

(75) Inventors: Jussi Nurmi, Parainen (FI); Teemu Korpimäki, Turku (FI); Timo Lövgren, Turku (FI); Hannu Kojola, Riihikoski (FI); Antti Iitia, Masku (FI)

(73) Assignee: Abacus Diagnostica Oy, Turku (FI)

( * ) Notice: Subject to any disclaimer, the term of this patent is extended or adjusted under 35 U.S.C. 154(b) by 671 days.

(21) Appl. No.: 11/628,355

(22) PCT Filed: Jun. 3, 2005

(86) PCT No.: PCT/FI2005/050196

§ 371 (c)(1),
(2), (4) Date: Feb. 22, 2007

(87) PCT Pub. No.: WO2005/118144

PCT Pub. Date: Dec. 15, 2005

(65) Prior Publication Data

US 2008/0268434 A1 Oct. 30, 2008

Related U.S. Application Data

(60) Provisional application No. 60/576,820, filed on Jun. 4, 2004.

(30) Foreign Application Priority Data

Jun. 4, 2004 (FI) .................................. 20040772

(51) Int. Cl.
*C12M 1/34* (2006.01)
(52) U.S. Cl. .................................. 435/287.1
(58) Field of Classification Search ........................ None
See application file for complete search history.

(56) References Cited

U.S. PATENT DOCUMENTS

| | | | |
|---|---|---|---|
| 4,902,624 A * | 2/1990 | Columbus et al. ........ 435/285.1 |
| 5,348,853 A * | 9/1994 | Wang et al. ..................... 435/6 |
| 5,446,263 A | 8/1995 | Eigen et al. .................. 219/521 |
| 5,656,493 A | 8/1997 | Mullis et al. .............. 435/286.1 |
| 6,033,880 A | 3/2000 | Haff et al. ................... 435/91.1 |
| 6,140,110 A | 10/2000 | Vinayagamoorthy et al. ........................ 435/285.1 |
| 6,200,781 B1 * | 3/2001 | Tal et al. ..................... 435/91.1 |
| 6,335,166 B1 | 1/2002 | Ammann et al. ................ 435/6 |
| 6,369,893 B1 | 4/2002 | Christel et al. .............. 356/417 |
| 6,787,338 B2 | 9/2004 | Wittwer et al. ............. 435/91.2 |
| 6,913,931 B2 * | 7/2005 | Halverson et al. ........... 436/165 |
| 2002/0028923 A1 * | 3/2002 | Cowsert et al. ............. 536/23.1 |
| 2004/0029258 A1 * | 2/2004 | Heaney et al. ............. 435/287.2 |
| 2004/0166569 A1 | 8/2004 | Marziali et al. ............ 435/91.2 |
| 2005/0196328 A1 * | 9/2005 | Fouillet et al. .............. 422/100 |
| 2006/0166371 A1 * | 7/2006 | Testa et al. .................. 436/174 |

FOREIGN PATENT DOCUMENTS

| | | |
|---|---|---|
| EP | 0 318256 | 5/1989 |
| EP | 0 723 812 | 7/1996 |
| EP | 0 872 562 | 10/1998 |
| WO | WO 03/007677 | 1/2003 |
| WO | WO 2004/045772 | 6/2004 |

* cited by examiner

*Primary Examiner*—Ann Y Lam
(74) *Attorney, Agent, or Firm*—James C. Lydon

(57) ABSTRACT

A method for rapid thermal control of a reaction volume from a preceding temperature to a target temperature includes first bringing at least the reaction vessel's second wall, which has high thermal conductivity, into direct contact with a first thermal block at a temperature higher than the target temperature if the target temperature is higher than the preceding temperature, or at a temperature lower than the target temperature if the target temperature is lower than the preceding temperature, until the reaction volume temperature is at least close to the target temperature; and then bringing the second wall into direct contact with a second thermal block at the target temperature. Also disclosed is a system (20) for detecting and/or quantitating a biological and/or chemical analyte in a sample and a software product for the system.

18 Claims, 4 Drawing Sheets

TEMPERATURE CONTROL OF REACTION VESSEL, SYSTEM WITH REACTION VESSEL, SOFTWARE PRODUCT FOR SYSTEM AND USE OF SYSTEM

This application is the U.S. National Stage of International Application No. PCT/FI2005/050196, filed Jun. 3, 2005, which claims benefit of U.S. Provisional Application No. 60/576,820, filed Jun. 4, 2004, and Finnish Application No. 20040772, filed Jun. 4, 2004.

FIELD OF THE INVENTION

The present invention relates to a method for rapid temperature control of a reaction vessel comprising a reaction volume for reacting of biological or chemical analytes to detect and/or quantitate said analytes in a sample containing said analytes. The present invention also relates to a system and software for the system for use in the method. The present invention further relates to the use of the system for detection of specific types of analytes.

BACKGROUND OF THE INVENTION

The publications and other materials used herein to illuminate the background of the invention, and in particular, cases to provide additional details respecting the practice, are incorporated by reference.

The polymerase chain reaction (PCR; Saiki et al., 1985) is a good example of a chemical reaction that requires careful temperature control: in PCR, a specific DNA sequence is amplified by subjecting the DNA sample to cyclic temperature changes. First, the double stranded DNA template is denatured by increasing the temperature of the reaction mixture up to approximately 95° C. Then, the temperature is lowered to approximately 40-70° C. At this temperature, short synthetic oligonucleotide primers hybridize to their complementary sequences rendered into a single stranded state in the previous heating step. After this, the temperature can be increased to approximately 72° C. At this temperature, a heat stable DNA polymerase extends the primers, thus creating a complementary copy of the original single stranded template DNA. (In many applications, this extension step can be performed at the same temperature as the hybridization step. Quite often, both primer hybridization and primer extension are performed at approximately 60° C.). By repeating the temperature cycle many times, the amount of template DNA is, if the amplification efficiency is ideal, doubled at each cycle. In addition to PCR, many if not all biological and chemical reactions require a certain temperature to occur in a predictable manner. Examples of such reactions with defined temperature requirements include other nucleic acid amplification reactions [such as nucleic acid sequence based amplification (NASBA) (Compton, 1991), ligase chain reaction (LCR) (Barany, 1991), strand displacement amplification (SDA) (Walker et al., 1992) and rolling circle amplification (RCA) (Banér et al. 1998)], immunocomplex formation (i.e. binding of an antibody to an antigen) (Price and Newman, 1997) and nearly all other enzymatic and chemical reactions.

A number of solutions exist for controlling a reaction temperature. In PCR, one normally places the reaction vessels in a block of metal, the temperature of which is changed periodically. However, a major drawback of this approach is that a significant amount of time is required for the block to change its temperature: once the target temperatures have been reached, the reaction itself occurs very fast. Therefore, it is the thermal mass of the block that is limiting the speed of the reaction rather than the reaction itself.

The rate of temperature change inside a reaction vessel can be increased by a technique known to those skilled in the art as over or under shooting: To cool the contents of a reaction vessel to a low target temperature, the metal block is first cooled to a temperature below the target temperature, after which the metal block is heated to the target temperature. Alternatively, to heat the contents of the reaction vessel to a high target temperature, the metal block is first heated to a temperature that is above the target temperature, after which the block is cooled to the high target temperature. In this manner, the rate of temperature change inside a reaction vessel can be increased. However, the process is still rather slow due to the fact that it takes time for the metal block to change its temperature.

Another approach for thermal cycling includes the use of hot and cold air to change the temperature of a reaction mixture that is placed inside a glass capillary with a great surface-to-volume ratio (Wittwer et al., 1997). This allows very rapid temperature change. However, when glass capillaries are used, the maximum reaction volume is often so small that it starts to limit the analytical sensitivity of the application. Also, the chemical properties of glass may inhibit some chemical reactions. The fragility of glass capillaries is also a problem as they break very easily when handled. Another approach is based on physically moving the reaction mixture through a channel that passes through areas of different temperatures. Such a technique has been described by for example Kopp et al. (1998). In these applications, however, the reaction volumes are even smaller and thus analytical sensitivity is heavily compromised. Also, one either has to reuse the same amplification channel for many samples, which introduces a serious risk of carry-over contamination between different samples or alternatively, the amplification vessels have to be of a disposable, single-use design, which increases the total costs of the assay significantly since the production costs of microfluidic channels can be much higher than the production costs of simple plastic reaction tubes, depending on manufacturing volume of course. Yet another approach is based on having several metal blocks or water baths at defined temperatures and changing the place of the reaction vessel cyclically between the blocks or baths of different temperatures. Examples of commercially available thermal cyclers based on this principle include the RoboCycler (Stratagene, USA) and the H2OBIT Thermal Cycler (ABgene, United Kingdom). In these applications one achieves a higher rate of temperature change than with a single block. However, since sample tubes with small surface-to-volume ratios are used, the rate of temperature change is still not as fast as it can be.

Techniques in which a reaction vessel with a high surface-to-volume ratio is transferred cyclically between thermal blocks at defined temperatures have been described in U.S. Pat. No. 4,902,624, EP 0 31 8255 and in U.S. Pat. No. 5,736,106. In these approaches, certain problems are encountered. First of all, the rate of temperature change is not ideal for all applications. Secondly, when the reaction mixture is heated up to high temperatures, the pressure inside the reaction vessel increases, which may result in that the reaction vessel breaks and the reaction mixture evaporates.

Where cyclic changes of temperature are not needed, for example in most immunoassays, it is common practice to place the reaction vessel in the atmosphere of an incubator set at a defined temperature. In such procedures, a significant amount of time is spent on heating up or cooling the contents of the reaction vessel since, due to the poor surface-to-volume ratio of the vessels and the poor thermal conductivity of static air, the rate of thermal exchange between the vessel and its surroundings are not ideal.

OBJECTS AND SUMMARY OF THE PRESENT INVENTION

One object of the present invention is to provide a method for rapid thermal control of a reaction volume (4) of a reaction vessel (2). Another object of the present invention is to provide an improved system (20) for detecting and/or quantitating a biological and/or chemical analyte or analytes in a sample supposedly containing said analyte or analytes. A further object of the present invention is to provide a software product for the detecting and/or quantitating system.

Thus, this invention concerns a method for rapid thermal control of a reaction volume (4) of a reaction vessel (2) comprising an enclosed reaction volume (4) being $\leq 2$ ml, preferably $\leq 50$ µl, enclosed by at least two walls (6, 8), a first wall (6) and a second wall (8), said first wall (6) being of a first material that is permeable to at least one wavelength of light and said second wall (8) being of a second material with a high thermal conductivity wherein thermal control of said reaction volume (4) in said reaction vessel (2) comprises a change of temperature of the reaction volume (4) from a preceding temperature to a target temperature. Characteristic for the method is that said change of temperature is carried out by a) first bringing at least the second wall (8) of a second material with a high thermal conductivity of the reaction vessel (2) in direct contact with a first thermal block (14-19)
  i) at a temperature higher than the target temperature if the target temperature is higher than the preceding temperature, or correspondingly
  ii) at a temperature lower than the target temperature if the target temperature is lower than the preceding temperature, for a time needed to bring the temperature of the reaction volume (4) to or close to the target temperature; and b) then bringing at least said second wall (8) in direct contact with a second thermal block (14-19) at the target temperature to bring the reaction volume (4) to said target temperature and/or keep the reaction volume (4) at said target temperature for the time intended, wherein the first thermal block (14-19) is at a constant predetermined first temperature and the second thermal block (14-19) is at a constant predetermined second temperature, i.e. the target temperature.

The invention also concerns a system (20) for detecting and/or quantitating a biological and/or chemical analyte or analytes in a sample supposedly containing said analyte or analytes which comprises i) one or more reaction vessel (2) comprising an enclosed reaction volume (4) being $\leq 2$ ml, preferably $\leq 50$ µl, enclosed by at least two walls (6, 8), a first wall (6) and a second wall (8), said first wall (6) being of a first material that is permeable to at least one wavelength of light and said second wall (8) being of a second material with a high thermal conductivity, ii) four or more thermal blocks (14-19), and iii) means (22) for bringing at least the second wall (8) of a second material with a high thermal conductivity of said reaction vessels (2) in direct contact with each of said thermal blocks (14-19).

Characteristic for the system is that it further comprises a data processing unit with software for dedicated data reduction for said detecting and/or quantitating of said analyte or analytes and said data processing unit controls at least one temperature change of the reaction volume (4) from a preceding temperature to a target temperature according to the method of claim 1.

The invention further concerns a software product for the detecting and/or quantitating system according to the invention. Characteristic for the software product is that it comprises means for controlling a processing unit to control at least one temperature change of the reaction volume (4) from a preceding temperature to a target temperature according to the method of the invention.

The invention additionally concerns uses of the system according to the invention for real-time polymerase chain reaction (real time PCR), for nucleic acid amplification reactions, preferably nucleic acid sequence based amplification (NASBA), strand displacement amplification (SDA), rolling circle amplification (RCA) and ligase chain reaction (LCR), and for ligand binding assays.

DETAILED DESCRIPTION OF THE INVENTION

Figure 1:
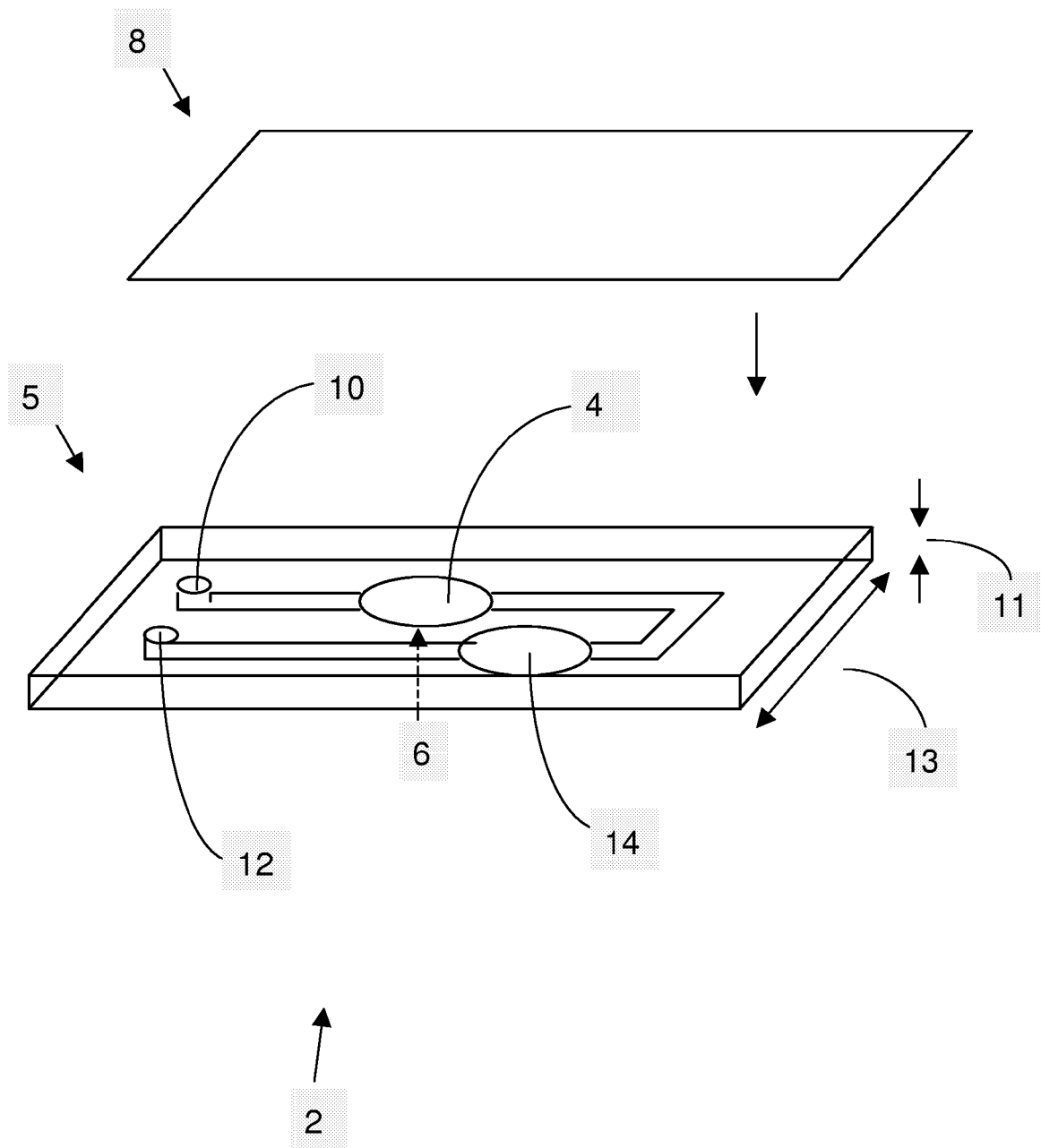
FIG. 1 shows a schematic drawing of an embodiment of a reaction vessel according to the present invention.

The term ligand binding assay as used herein refers to any analytical method in which at least one covalent or non-covalent bond is formed between a binding agent and a ligand thereof.

The term binding agent, as used herein, refers to any molecule capable of forming at least one covalent or non-covalent bond with a second molecule. Examples of binding agents include but are not limited to immunoglobulins and derivatives thereof, such as recombinant antibodies, Fab fragments and scFv fragments; nucleic acid binders such as nucleic acids and nucleic acid derivatives and aptamers and DNAzymes and ribozymes; and proteins capable of binding specific ligands.

The term ligand as used herein refers to any molecule capable of forming at least one covalent or non-covalent bond with a binding agent. A ligand can be naturally occurring or synthetic. In a ligand binding assay, a ligand can be the analyte and/or a substance needed in the detection of the analyte.

The term temperature close to the target temperature, as used herein, refers to a temperature that is no more than 3° C. higher or lower than the target temperature, typically no more than 1° C. higher or lower than the target temperature, preferably no more than 0.5° C. higher or lower than the target temperature.

The present invention provides a method that allows rapid thermal control of the contents of a reaction vessel. Typically several changes of temperature of the reaction volume are carried out, and more than one of said changes of temperature are carried out using a pair of thermal blocks consisting of a first and second thermal block, wherein each thermal block of each said pair can also be a thermal block of one or more of the other said pairs, according to steps a) and b) defined above. Preferably all changes of temperature of the reaction volume are carried out according to these steps.

By using a first and a second block according to steps a) and b) above, the rate of temperature change inside a reaction vessel is higher than in a case where only a second block, maintained at the target temperature, is used to change the temperature inside the reaction vessel to the temperature of the second block. An additional advantage of using a first block according to step a) above is that the temperature of the second block, maintained at the target temperature, remains more constant, which results in more accurate control of the temperature inside the reaction vessel. This is because when a first block is used according to step a) above, a reaction vessel that enters, according to step b) above, the second block maintained at the target temperature is already at the target temperature or at a temperature close to the target temperature. Since the temperature difference between the reaction vessel and the second block maintained at the target temperature is very small at the time of transferring the reaction vessel into the second block, the effect of the reaction vessel on the temperature of the second block is very small. If a first block was not used according to step a) above, the effect of transferring a reaction vessel into a block maintained at the target temperature would have a greater effect on the temperature of the block and it would consequently take time and energy to return the temperature of the block to the target temperature. This would make it more difficult to control the temperature of the contents of the reaction vessel.

The vessel is typically flat in shape and comprises a container space where analyte specific reactions may occur. Furthermore, the vessel typically comprises two channels and two holes. When a sample is inserted into the vessel through a first hole, said sample flows through a first channel into said container space and excess gas flows away from said container space through a second channel and exits from the reaction vessel through a second hole. The walls of the vessel are typically thin and typically one of the walls is made of a material that is permeable to visible and ultraviolet light and one of the walls is made of a material with high thermal conductivity, such as a metal foil.

The method of the present invention provides for rapid thermal control of a liquid. The method typically comprises the steps of placing said liquid inside a typically flat reaction vessel; placing said reaction vessel in a reaction vessel holder that is attached to a movable support that is capable of assuming different positions; and moving said movable support in order to place the reaction vessel into a slot that is inside a thermal block maintained at a defined temperature. To increase the temperature inside the reaction vessel up to a certain target temperature, the vessel is first positioned in the slot of a thermal block that is hotter than said target temperature and then placed into a block that is at said target temperature. To decrease the temperature inside the reaction vessel down to a second target temperature, the vessel is first placed inside a thermal block that is cooler than said second target temperature and then into a block that is at said second target temperature.

The present invention further provides a system for detecting and/or quantitating a biological and/or chemical analyte or analytes in a sample supposedly containing said analyte or analytes comprising a temperature cycling system for rapid thermal control of a liquid, said system typically including a) thermal blocks maintained at constant predetermined temperatures and a movable support that incorporates at least one reaction vessel holder, said movable support being capable of assuming several different positions in which the reaction vessel holder is brought into the immediate proximity of said thermal blocks and b) at least one reaction vessel that can be placed in the reaction vessel holder of said movable support in such a manner that when said reaction vessel holder is placed into the immediate proximity of a thermal block, said reaction vessel is inside a slot of the thermal block, and typically two sides of the flat reaction vessel being in close contact with said thermal block.

In a typical embodiment of the invention the thermal conductivity of the second material, i.e. the material of the second wall of the reaction volume of the reaction vessel, is $\geq 10$ mW/mmK, preferably $\geq 2\text{-}100$ mW/mmK. The material is typically a metal, preferably aluminium or copper. The thickness of the second wall is typically $\leq 0.5$ mm, preferably $\leq 0.1$ mm. The outer surface of the second wall is typically flat, preferably planar. In a typical embodiment of the reaction vessel according to the invention the ratio of the area of the second wall enclosing, i.e. the area of the second wall facing, the reaction volume to the said volume is $\geq 0.5$ mm$^2$/µl, preferably $\geq 5$ mm$^2$/µl.

Typically the first wall of reaction vessel is permeable to visible and ultraviolet (UV) light. The first material of the first wall is typically plastic or glass. The thickness of the first wall is typically $\leq 5$ mm, preferably $\leq 2$ mm.

In typical embodiments of the system according to the invention the reaction vessel comprises an inlet for insertion of the sample and optionally reagents into the reaction volume and an outlet from the reaction vessel for discharging displaced air and/or the sample and reagents from the reaction volume. Typically the reaction vessel further comprises an expansion volume, between the outlet of the reaction vessel and the reaction volume, for expansion of the sample and/or reagents when reacting and/or for accommodating vapour pressure created by heating.

In preferred embodiments of the method of the invention the ratio of the area of the second wall in direct contact with the thermal blocks to the reaction volume is $\geq 0.5$ mm$^2$/µl, preferably $\geq 5$ mm$^2$/µl.

Typical embodiments of the system according to the invention comprise more than four thermal blocks being at different predetermined temperatures. In some preferred embodiments, the predetermined temperatures of these four blocks would be approximately 10-25° C.; 40-72° C.; 80-98° C.; and 90-120° C. However, the number of blocks can be greater than four and the temperatures of the blocks may differ from the temperatures given above. Typical embodiments of the system comprise means for bringing more than one wall of said reaction vessels in direct contact with the thermal blocks. The means for bringing the wall or walls of the reaction vessel in direct contact with the thermal blocks typically comprise a support for said vessel with means for moving said support in a circular or linear path and said thermal blocks are at different points of said circular or linear path so that said wall or walls of said reaction vessel can be brought in direct contact with each thermal block by moving said support along said circular or linear path.

According to a preferred embodiment the system comprises means for pressing the wall or walls of said reaction vessel and the wall or walls of the thermal blocks in direct contact with each other against each other. Such means could be any mechanical, electromechanical, pneumatic or hydraulic means, e.g. a simple comprising a spring or springs.

Description of the Reaction Vessel of the System

FIG. 1 shows a schematic drawing of a reaction vessel 2 of an embodiment of the system according to the present invention. One wall 8, of the vessel 2 is detached from the body 5 of the vessel for sake of clarity of the figure. When in use, the wall 8 is tightly attached to the body 5. The body 5 of the vessel 2 is made of polypropene and the detached wall 8 of e.g. aluminium foil. The body 5 is permeable to at least one wavelength of light. The vessel 2 comprises a hole 10 for insertion of a sample, a channel through which the sample flows into a reaction volume 4, a second channel, an expansion volume 14, a third channel and a second hole 12 through which air displaced by the sample flows out of the reaction vessel 2. The reaction vessel 2 can be sealed for example by pressing the holes 10, 12 with a hot press so that the plastic melts and therefore blocks the holes 10, 12 or, for example, by inserting caps into the holes 10, 12 that fit the holes 10, 12 tightly and thus prevent any leakage of liquid or gas through the holes 10, 12 after sealing. The forms of the holes 10, 12; channels; reaction volume 4; and expansion volume 14 are determined by the structure of the body 5 of the reaction vessel 2; however, one wall 8 of the reaction vessel 2 is made of a relatively thin material with a high thermal conductivity, such as aluminium foil which can be attached to the body 5 of the vessel 2 for example with the help of a heat press. Suitable materials, other than aluminium foil, of the detached part 8 include, but are not limited to, copper and other metals. In this embodiment the foil forms one wall of each channel and of the reaction volume 4 and of the expansion volume 14. Analytical reactions take place mainly inside the reaction volume 4. When a reaction mixture inside the reaction volume 4 is heated, the expansion volume 14 allows expansion of the analytical reaction mixture within the reaction volume 4 and prevents breakage of the reaction vessel 2 that could be caused by the increased pressure brought about by evaporation during heating. Rapid thermal control of the contents of the reaction vessel is enabled by the high surface-to-volume ratio of the vessel. For example, a suitable surface-to-volume ratio is 1 square millimetre per 1 microlitre and preferably, it should be even higher. To increase the speed of thermal control of the contents of the reaction vessel, the reaction vessel is preferably flat: its thickness 11 is smaller than its broadness 13. The flat shape together with the fact that one of the walls 8 is made of a material with a high thermal conductivity, such as aluminium foil, enables improved thermal control of the contents of the reaction volume. In addition to the thermal and structural characteristics of the reaction vessel 2 of the present invention, said vessel 2 is characterised by its optical properties. Suitably, the body 5 of the vessel 2 is made of a material that allows fluorescence measurements to be done through the wall 6 of the reaction volume 4 comprised of a part of the body 5 of the vessel 2. In one preferable application, the measurements are done by time-resolved fluorometry. All materials used to make the vessel 2 should preferably withstand elevated (up to approximately 80-120° C.) temperatures, such as the high temperatures required to perform the polymerase chain reaction. Suitable materials for the body 5 of the vessel 2 include but are not limited to polypropene and other plastics as well as glass. Several variations of the basic structure of the vessel 2 can be constructed. For example, several compositions of holes, channels and volumes can be mounted on a single body, enabling the analysis of more than one sample on one body. On the other hand, several reaction volumes, each used for the analysis of at least one analyte, can be mounted on a single body so that a sample, when inserted through the first hole, is divided into several channels which lead into several separate reaction volumes. A reaction vessel of the system according to the present invention can be used for example to perform a polymerase chain reaction (PCR), suitably real-time PCR, and other nucleic acid amplification reactions, such as nucleic acid sequence based amplification (NASBA), strand displacement amplification (SDA), rolling circle amplification (RCA), reverse transcription PCR (RT-PCR), and ligase chain reaction (LCR). The reaction vessel can also be used to perform immunoassays and other ligand binding assays.

Description of the System

Figure 2A:
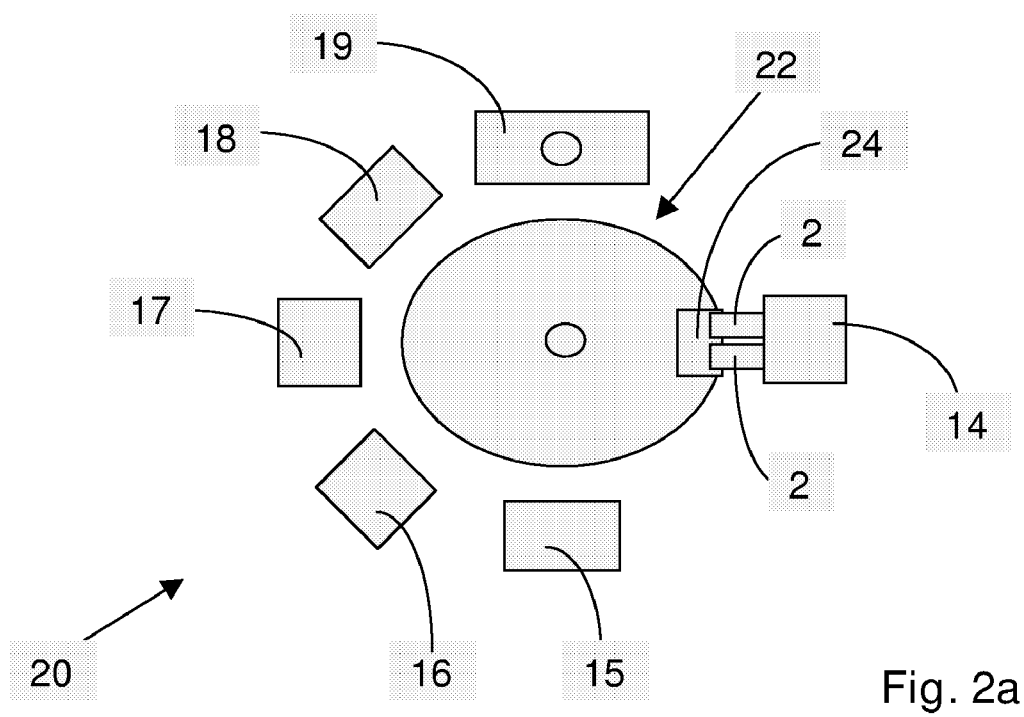
FIGS. 2a and 2b schematically shows an embodiment of a system according to the present invention.
Figure 2B:
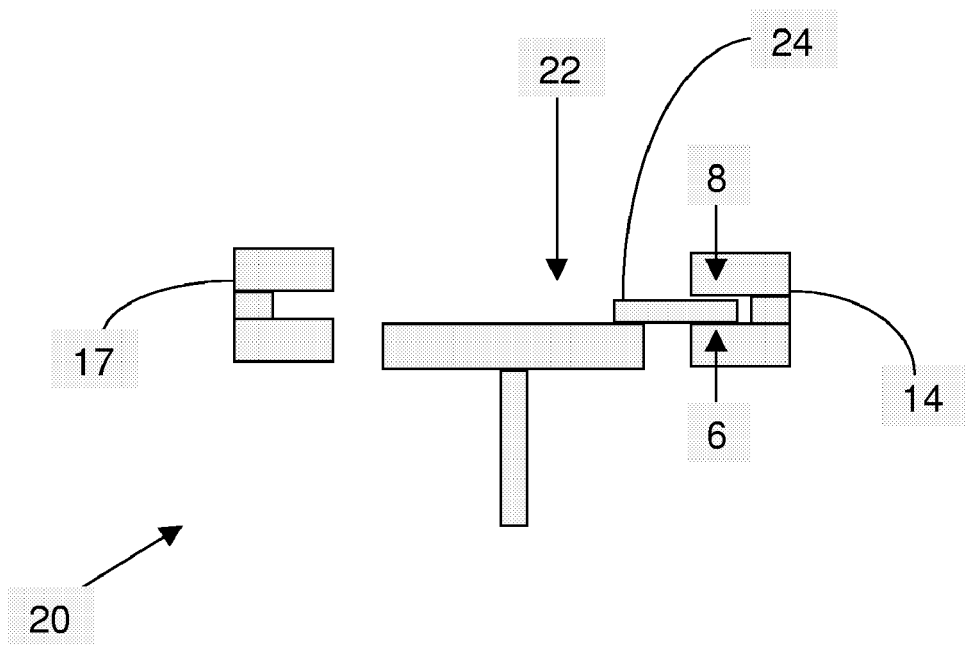

FIGS. 2a and 2b schematically shows an embodiment of a system 20 according to the present invention. In FIG. 2a the system 20 is viewed from the top and in figured 2b a cross-section from the side is viewed. The system 20 comprises reaction vessels 2, a disk 22 to which a reaction vessel holder 24 is attached and heat blocks 14-19. The disk 22 is controlled by a step motor (not shown), which moves the reaction vessel holder 24 and vessels 2 attached to it from one heater block 14-19 to another 14-19 as fast as possible. The motor is controlled by programmable electronics.

One 14 of the heat blocks 14-19 could be more precisely referred to as a cold block, whereas it is made to be kept at a low temperature. It is made of metal with high heat conductance properties. The block has a slit, which can accommodate the reaction vessels. The lid of the slit can be spring loaded so that it is lightly pressed on the cuvettes. Alternatively, the system may comprise means for pressing the reaction vessels against the lid or the bottom of the slit so as to achieve a higher efficiency of heat transfer between the block and the reaction vessel. The cold block can be maintained at a temperature of e.g. 10° C., which can be realized with for example a Peltier-element and electronics needed to control it.

Some of the other heat blocks 15-18 are, as well, made of a metal with high heat conductance properties. The blocks 15-18 have slits, which can accommodate the reaction vessels 2. The lids of the slits can be spring-loaded so that they are lightly pressed on the vessels 2. Alternatively, the system may comprise means for pressing the reaction vessels against the lid or the bottom of the slit so as to achieve a higher efficiency of heat transfer between the block and the reaction vessel. The temperatures of the heat blocks 15-18 are adjustable (typically between 40-120° C.) with heaters and electronics controlling them (not shown).

Another 19 of the heat blocks 14-19 is a measurement block 19. It 19 is like the heat blocks, but with a hole on top for fluorescence measurement. The block and the reaction vessels in it need to be well protected from external light.

The measurement block of the device has a UV-light source (e.g. flash lamp), the energy of which is guided to the vessel to be measured through filters, lenses and the hole in the measurement block. The long-lifetime (approximately 100 µs) emission coming from the vessel after excitation has ended is guided through the hole in the measurement block, lenses and filters and finally measured with e.g. a photomultiplier tube.

The purpose of the system 20 is to change the temperature of liquids inside the reaction vessels 2 as fast as possible between temperatures typically within a range of 40-120° C. Typically the system 20 should be able to measure time-resolved fluorescence from the reaction vessels 2. The user can program the temperatures of the blocks (cold block is typically always at 10° C., heat blocks at temperatures of 40-120° C.), the time-table followed by the step motor and the time table of fluorescence measurement can be controlled either with a laptop computer interfacing with the system or with an inbuilt interface panel. The system is preferably as small and as light as possible. It can be portable or even handheld.

The software that is used to control the thermal control process directs the precise transfers of the reaction vessel between different thermal blocks in order to achieve a desired thermal profile for the reaction mixture inside the vessel. In principle, temperature control inside the vessel can be based on two different mechanisms: the incubation times in the different thermal blocks can be calibrated with a temperature sensor so that a thermal profile that approximates the desired thermal profile as closely as possible is achieved by programming the approximate times that the vessel has to dwell in each thermal block. Alternatively, a feed-back mechanism can be constructed that allows the program to measure the temperature inside the vessel in real time and to carry out the required transfers based on the true temperature inside the vessel. Both or just one of these mechanisms can be utilized by the software included in the system to control the thermal control process.

In addition to controlling the temperature changes, the data processing unit and its associated software is or can be used in the detection and/or quantitation of the analyte or analytes. If the system incorporates a fluorescence or time-resolved fluorescence measurement unit, the software can be used to direct the measurement unit so that fluorescence or time-resolved fluorescence signals are recorded inside the vessel either during the thermal cycling protocol or after the thermal cycling protocol has been finished. According to an analytical algorithm contained in the software or programmed by the user or by the manufacturer of the system, the software then calculates and reports a qualitative and/or quantitative result of the particular reaction that is based on the result(s) of the fluorescence or time-resolved fluorescence measurement(s). If, for example, the reaction vessel is used in PCR detection of a harmful bacterium, the reaction vessel can contain a sample suspected to contain the bacterium and all PCR reagents, including fluorogenic detection reagents that give an increased fluorescence signal if DNA of said harmful bacterium is amplified inside the vessel. In such a case, the software would be programmed to control the fluorescence measurement unit so that the measurement unit would perform fluorescence measurements at appropriate times and so that the reaction vessel is appropriately positioned in relation to the measurement unit. Based on the recorded fluorescence signals, the software then reports whether or not the sample contained said bacterium. In addition to such qualitative analytical processes, the software can carry out more complex calculations that allow quantitative determination of the target analyte.

The software normally also contains features that allow quality control of the results with the help of defined control samples containing a known amount of the target analyte. Also, the software contains features that allow monitoring of the analytical and physical performance of the system. The software also allows storage of thermal and analytical data from completed thermal cycling and measurement runs. It is also possible to include in the system a bar-code reader that is connected to the software so that the software recognizes each reaction vessel inserted into the system on the basis of a bar code printed on the vessel and is capable of, based on the information contained in the bar code printed on the vessel and on information stored in the software, to carry out a desired thermal cycling and measurement protocol and to analyze, report and store the obtained data in a manner that is appropriate to the reaction vessel in question. It will be appreciated by those skilled in the art that instead of a bar code, a different coding technique can be used as long as it is capable of conveying relevant information related to the contents of the reaction vessel to the software that controls the system.

Temperature Control

To control the temperature inside a reaction vessel such as the one described above, an ideal method is to attach the reaction vessel to a solid support that is capable of assuming several different positions. In close proximity to the solid support, several thermal blocks are placed. Ideally, the blocks are made of a metal or some other material with a high thermal conductivity. Suitably, the blocks are shaped so that they incorporate a slot into which the flat reaction vessel fits as tightly as possible. In one ideal embodiment of the present invention, the blocks also feature a mechanism, for example a spring-loaded lid, that ensures tight contact between the block and the reaction vessel when the solid support moves to insert a reaction vessel into a slot of a thermal block. In a suitable embodiment, the size of the thermal block and of the slot within it is such that when a reaction vessel is positioned inside the slot of the thermal block, then at least one, preferably two, preferably three surfaces of the reaction vessel are as much covered by the surface of the thermal block as possible. At least one of the thermal blocks can also include a hole that is positioned so that when a reaction vessel is in the slot of the thermal block that incorporates such a hole, luminescence measurements can be done through the hole and the wall of a reaction volume. To increase the temperature inside the reaction vessel up to a target temperature, the solid support to which the vessel is attached moves to insert the reaction vessel into the slot of a thermal block that is hotter than the target temperature. The reaction vessel is kept in this first heating block for a time required to bring the temperature inside the vessel to or close to the target temperature; then the solid support moves to transfer the reaction vessel out of the first heating block and into a second block that is maintained at the target temperature. To cool the contents of a reaction vessel, the vessel is first transferred into the slot of a block that is cooler than the target temperature; kept in the cooling block for a time required to decrease the temperature inside the reaction vessel to or close to the cool target temperature; and then the vessel is transferred to a block that is maintained at the cool target temperature. In this manner, the rate of temperature change inside the reaction vessel can be accelerated if compared to a method where the reaction vessel is transferred directly to a target temperature or if compared to a method where the temperature of the thermal block is changed instead of the position of the reaction vessel. The solid support and the surrounding thermal blocks can be constructed in a variety of different ways. Suitably, for example, the thermal blocks are positioned as a circle so that the solid support, positioned in the middle or just outside the circle formed by the blocks, can change the position of the reaction vessel attached to it by engaging in a circular motion either around its own axis (in which case the solid support is in the middle of the circle formed by the blocks) or around the axis of the circle formed by the blocks (in which case the solid support is situated outside the circle formed by the blocks). Alternatively, the thermal blocks can be positioned for example as a linear row, in which case the solid support moves back and forth along the row to transfer a reaction vessel between thermal blocks. Also, in a single instrument setting, several sets of thermal blocks can exist to allow simultaneous thermal control of several reaction vessels. Also, the thermal blocks can be larger in size than a single reaction vessel, thus allowing the insertion of more than one reaction vessel at one time.

EXAMPLES

Example 1

Effect of Using Heat Blocks Hotter and Cooler than the Target Temperatures on the Rate of Temperature Increase and Decrease in the Reaction Vessel of the System To optimize the speed of thermal cycling, a system according to the present invention was constructed that comprises several heat blocks maintained at predetermined temperatures. The blocks were maintained at 29° C. (the cold block); 61° C.; 97° C. and 115° C. A temperature sensor was placed inside a flat reaction vessel and the heating and cooling rates of the contents of the vessel were determined using two different methods of thermal cycling. In the first method, the reaction vessel was transferred from the block at 61° C. directly to the block at 97° C. and from the block at 97° C. directly back to the block at 61° C. The second method was performed according to the present invention so that to heat the contents of the reaction vessel from 61° C. to 97° C., the vessel was transferred from the block at 61° C. to the block maintained at 115° C. for ten seconds, after which the vessel was transferred to the block at 97° C. From the block at 97° C., the vessel was transferred to the block at 29° C. for ten seconds, after which the vessel was transferred back to the block at 61° C. The times it took for the contents of the vessel to heat from 61 to 97° C. (heating time) and to cool down from 97 to 61° C. (cooling time) were recorded using these two different methods of thermal cycling. Using the first method, the heating time from 61 to 97° C. was 25 seconds and the cooling time from 97 to 61° C. was 48 seconds. With the second method, the method of the present invention, the heating time was only 8 seconds, i.e. less than the time that the vessel was incubated at 115° C. The cooling time using the second method was only 7 seconds. Clearly, the method of the present invention provides significant improvement in the speed of thermal cycling: during a 40 cycle PCR reaction, these savings of 58 seconds per cycle sum up to approximately 40 minutes time saved, which is of importance in a laboratory that has to perform as many PCR reactions during a working day as possible. It is to be noted that the incubation times and exact temperatures used in this example were chosen arbitrarily; an even faster speed can be achieved by adjusting the cold block to a cooler temperature and the hot block to a hotter temperature. In this experiment, 10 second incubations at the hot and cold blocks were used, but these were actually too long: the target temperatures were reached in less than 10 seconds. Ideally, the reaction vessel would have been transferred from the hot block to the 97° C. block after 8 seconds and from the cold block to the 61° C. block after 7 seconds to prevent the reaction vessel from reaching temperatures higher than 97° C. or cooler than 61° C.

Example 2

Effect of Using Aluminium Foil as a Material in the Reaction Vessel of the System on the Rate of Temperature Change Inside the Vessel To determine the effect of using a metal foil instead of a plastic wall on one side of the reaction vessel, two identical polypropene vessel halves were laminated with either aluminium foil or a plastic foil. A temperature sensor was placed inside each vessel and the rates of temperature change were determined for both vessels using a system according to the present invention. This was done by changing the position of the vessel from a thermal block set at 105° C. to a block set at 27° C. for cooling or vice versa for heating. Separate temperature measurement data were recorded for cooling and heating the contents of the vessels. The data were fitted to a single exponential function and the half-lives of temperature change, i.e. the times required for the temperature inside the vessel to change to the half-point between 105° C. and 27° C., were determined. When a plastic foil was used, the half-lives for cooling and heating, respectively, were 7.6 and 9.6 seconds; for a vessel incorporating one wall made of a metal foil, the half-lives were 5.7 and 6.3 seconds. It is therefore clear that using one wall made of a material with a high thermal conductivity offers a clear advantage in terms of the speed of thermal control.

Example 3

Speed of Thermal Cycling Using the Method and System of the Present Invention Versus a Conventional Method of Thermal Cycling To demonstrate the accelerating effect of the present invention on the speed of thermal cycling, temperature sensors were placed inside a reaction vessel according to the present invention and inside a conventional, 0.2 ml plastic PCR tube. Both reaction vessels were filled with water and the temperatures inside the vessels were measured during a normal thermal cycling protocol, during which the temperature was cycled between 95° C. and 60° C. The temperature inside the reaction vessel according to the present invention was controlled using a system according to the present invention, in which the reaction vessel was positioned to a solid support, which was cylindrical in shape. Around the solid support, four thermal blocks were positioned, the temperatures of which were maintained at 27° C., 60° C., 95° C. and 105° C. To increase the temperature inside the vessel up to 95° C., the vessel was first positioned inside the slot of the block maintained at 105° C.; then, after a few seconds, the vessel was transferred to the block at 95° C. Then, to cool the reaction volume down to 60° C., the vessel was first transferred into the slot of the block at 27° C. for a few seconds, after which it was transferred to the block at 60° C. For comparison, the temperature change rates were measured inside a conventional 0.2 ml PCR tube, the temperature of the contents of which was controlled using a PTC 200 DNA Engine (MJ Research, USA).

Figure 3:
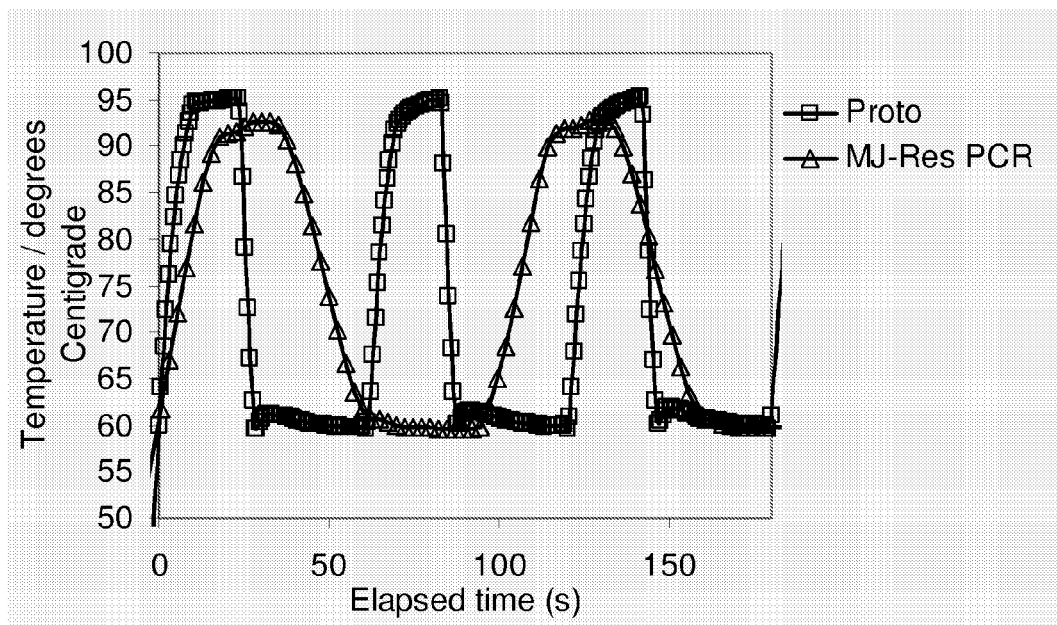
FIG. 3 shows control of reaction vessel temperature using a thermal cycling method and a system for thermal control according to the present invention and a conventional thermal cycler.

FIG. 3 shows control of reaction vessel temperature using a thermal cycling method and a system for thermal control according to the present invention (open squares; "Proto") or using a conventional 0.2 ml thin-wall PCR tube and a conventional thermal cycle (PTC 200 DNA Engine, MJ Research, USA; open triangles, MJ-Res PCR). The temperature measurement data is shown as a function of elapsed time. The rate of temperature change using the system according to the present invention (squares) is much higher than the rate obtained using a conventional PCR machine (triangles), which is based on using a metal block, the temperature of which is changed periodically. The time required to change the temperature inside the reaction vessel between the two target temperatures (95 and 60° C.) is much shorter for the prototype instrument than for the conventional PCR machine.

Figure 5:
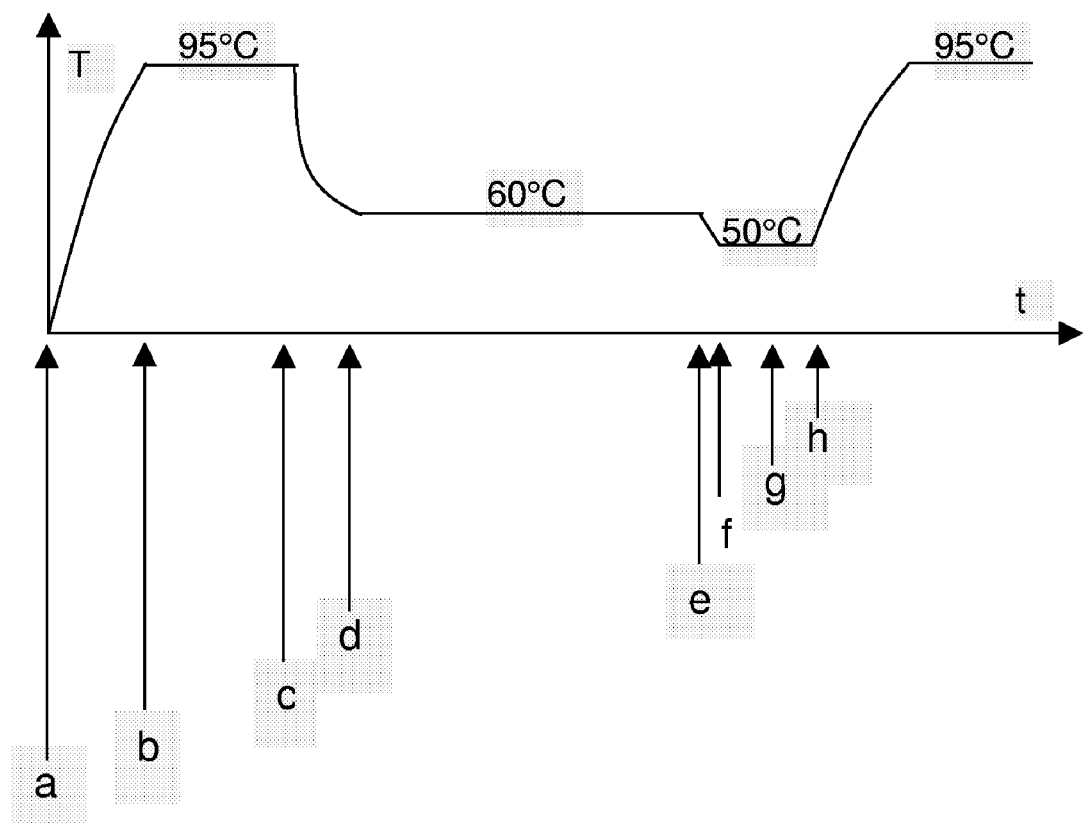
FIG. 5 schematically shows how control of temperature of reaction vessels can be carried out according to the invention.

FIG. 5 schematically shows how control of temperature of reaction vessels can be carried out. The figure shows temperature of the reaction vessels during steps a to h as a function of time. The steps are as follows:
a) 0 s: the vessels are moved to a heat block at 120° C.
b) 2 s: the vessels are moved to a heat block at 95° C.
c) 12 s: the vessels are moved to a cold block at 10° C.
d) 15 s: the vessels are moved to a heat block at 60° C.
e) 40 s: the vessels are moved to a cold block at 10° C.
f) 41 s: the vessels are moved to a measuring block at 50° C.
g) 42-45 s: fluorescence measurement is carried out
h) 46 s: the vessels are moved to a heat block at 120° C.; a new cycle starts.

The temperature curve showing the temperature of the vessels during the steps above clearly demonstrate very fast temperature control of the vessels.

Example 3

Use of the Method and System According to the Present Invention to Perform Real-Time Polymerase Chain Reaction To demonstrate the applicability of the present invention to performing real-time polymerase chain reaction, a PCR assay was set up for bacteriophage T4. The assay chemistry was as described by Nurmi et al. (2002). The sequences of the oligonucleotides used in the assay were as follows: 5' primer ATGTTCCACGCTAAAAGACCTTATTGAAAA (SEQ ID NO: 1); 3' primer CAGCAGAATGAACCGAATCCACAAATAT (SEQ ID NO: 2); europium labelled probe ATTATTCATCACCGAGCGACTATTCAAGATA (SEQ ID NO: 3) and QSY-7 labelled quencher probe GCTCGGTGATGAATAAT (SEQ ID NO: 4). 30 µl amplification reactions consisted of 1× HotMaster Taq buffer (Eppendorf, Germany), 0.3 µM primers, 28 nM europium probe, 280 nM quencher probe, 2.5 mM magnesium chloride, 0.2 mM dNTPs and 1.25 U HotMaster Taq polymerase. The amplification reactions were carried out using the kind of a reaction vessel described in FIG. 1. For thermal cycling, a thermal cycler according to the present invention was used (example 2). A thermal cycling protocol consisting of 40 cycles of 3 seconds at 95° C. and 13 seconds at 60° C. with heating and cooling in blocks maintained at 110 and 25° C., respectively, was used. Time-resolved europium fluorescence was measured at selected PCR cycles. All measurements were performed at room temperature.

Figure 4:
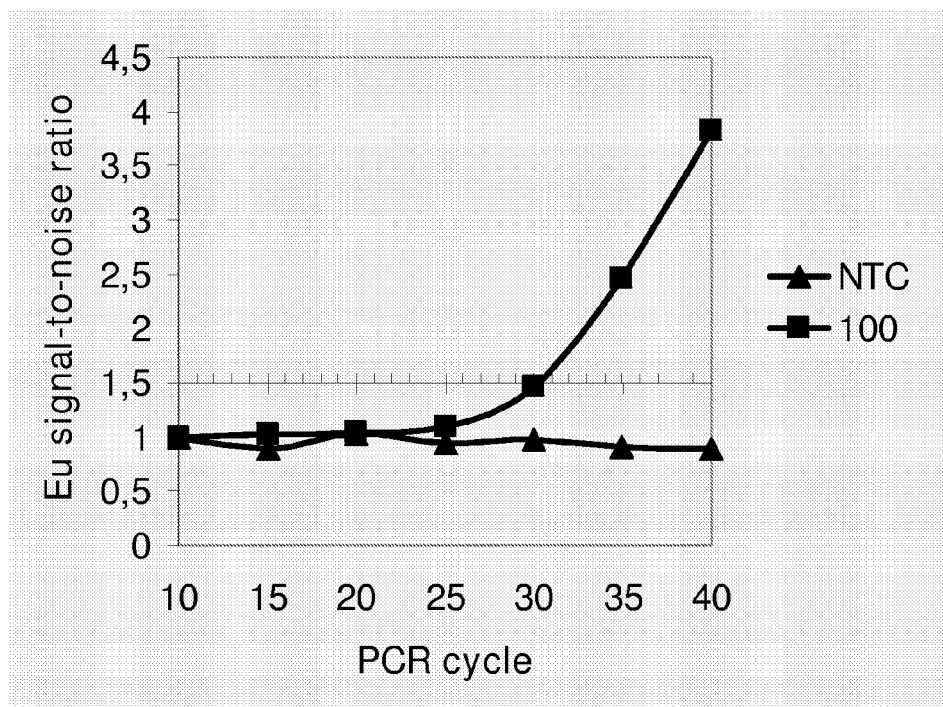
FIG. 4 shows an amplification plot showing the applicability of the present invention for performing real-time polymerase chain reactions.

FIG. 4 shows an amplification plot showing the applicability of the present invention for performing real-time polymerase chain reactions. Amplification plots obtained from a negative control reaction (NTC), where no bacteriophage T4 DNA was added to the reaction and from a positive reaction, into which approximately 100 copies of T4 DNA was added as template are shown. As can be seen in the figure, the presence of the specific target DNA in the sample results in a detectable increase in europium fluorescence. Therefore, it is clear that the reaction vessel, method of thermal control and system of thermal cycling described herein is applicable to real-time PCR.

It will be appreciated that the methods of the present invention can be incorporated in the form of a variety of embodiments, only a few of which are disclosed herein. It will be apparent for the specialist in the field that other embodiments exist and do not depart from the spirit of the invention. Thus, the described embodiments are illustrative and should not be construed as restrictive.

REFERENCES

Baner J, Nilsson M, Mendel-Hartvig M, Landegren U. (1998) Signal amplification of padlock probes by rolling circle replication. *Nucleic Acids Res.* 26(22):5073-8.

Barany F. (1991) Genetic disease detection and DNA amplification using cloned thermostable ligase. *Proc Nat Acad Sci USA.* 88(1):189-93.

Compton J. (1991) Nucleic acid sequence-based amplification. *Nature.* 350(6313):91-2.

Kopp M U, Mello A J, Manz A. (1998) Chemical amplification: continuous-flow PCR on a chip. *Science.* 280(5366):1046-8.

Nurmi J, Wikman T, Karp M, Lovgren T. (2002) High-performance real-time quantitative RT-PCR using lanthanide probes and a dual-temperature hybridization assay. *Anal Chem.* 74(14):3525-32.

Price C P, Newman D J (ed.) (1997) Principles and practice of immunoassay. Macmillan, London.

Saiki R K, Scharf S, Faloona F, Mulli K B, Horn G T, Erlich H A, Arnheim N (1985) Enzymatic amplification of beta-globin genomic sequences and restriction site analysis for diagnosis of sickle cell anemia. *Science* 230:1350-4.

Walker G T, Fraiser M S, Schram J L, Little M C, Nadeau J G, Malinowski D P. (1992) Strand displacement amplification—an isothermal, in vitro DNA amplification technique. *Nucleic Acids Res.* 20(7):1691-6.

Wittwer C T, Ririe K M, Andrew R V, David D A, Gundry R A, Balis U J. (1997) The LightCycler: a microvolume multisample fluorimeter with rapid temperature control. *Biotechniques.* 22(1):176-81.

The invention claimed is:

1. A method for rapid thermal control of a reaction volume (4) of a reaction vessel (2) comprising an enclosed reaction volume (4) being ≦2 ml, enclosed by at least two walls (6, 8), a first wall (6) and a second wall (8), said first wall (6) being of a first material that is permeable to at least one wavelength of light and said second wall (8) being of a second material with a high thermal conductivity wherein thermal control of said reaction volume (4) in said reaction vessel (2) comprises a change of temperature of the reaction volume (4) from a preceding temperature to a target temperature wherein said change of temperature is carried out by
   a) first bringing at least the second wall (8) of a second material with a high thermal conductivity of the reaction vessel (2) in direct contact with a first thermal block (14-19)
      i) at a temperature higher than the target temperature if the target temperature is higher than the preceding temperature, or correspondingly
      ii) at a temperature lower than the target temperature if the target temperature is lower than the preceding temperature,
   for a time needed to bring the temperature of the reaction volume (4) to or close to the target temperature; and
   b) then bringing at least said second wall (8) in contact with a second thermal block (14-19) at the target temperature to bring the reaction volume (4) to said target temperature and/or keep the reaction volume (4) at said target temperature for the time intended,
      wherein the first thermal block (14-19) is at a constant predetermined first temperature and the second thermal block (14-19) is at said target temperature,
      wherein said second wall (8) is brought into direct contact with said first and said second thermal blocks (14-19), and
      wherein said reaction vessel further comprises an expansion volume (14) in communication with an outlet (12) of said reaction vessel (2) and said reaction volume (4), for expansion of the sample and/or reagents when reacting and/or for accommodating vapor pressure created by heating.

2. The method according to claim 1 wherein several changes of temperature of the reaction volume (4) are carried out, and more than one of said changes of temperature are carried out each change using a pair of thermal blocks (14-19) consisting of a first and second thermal block (14-19), wherein each thermal block (14-19) of each said pair can also be a thermal block (14-19) of one or more of the other said pairs, according to steps a) and b).

3. The method according to claim 2 wherein all changes of temperature of the reaction volume (4) are carried out according to steps a) and b).

4. The method according to claim 1 wherein the thermal conductivity of the second material is ≧10 mW/mmK.

5. The method according to claim 1 wherein the second material of the second wall (8) is selected from the group consisting of metals.

6. The method according to claim 1 wherein the outer surface of the second wall (8) is flat.

7. The method according to claim 1 wherein the ratio of the area of the second wall (8) enclosing, i.e. the area of the second wall facing, the reaction volume (4) to the said volume is ≧0.5 mm²/µl.

8. The method according to claim 1 wherein heat transfer between the reaction vessel (2) and a thermal block (14-19) is enhanced by pressing the wall or walls (6, 8) of said reaction vessel (2) and the wall or walls of the thermal blocks (14-19) in direct contact with each other against each other.

9. A system (20) for detecting and/or quantitating a biological and/or chemical analyte or analytes in a sample supposedly containing said analyte or analytes which comprises
  i) one or more reaction vessel (2) comprising an enclosed reaction volume (4) being $\leq 2$ ml, preferably $\leq 50$ µl, enclosed by at least two walls (6, 8), a first wall (6) and a second wall (8), said first wall (6) being of a first material that is permeable to at least one wavelength of light and said second wall (8) being of a second material with a high thermal conductivity,
  ii) four or more thermal blocks (14-19), and
  iii) means (22) for bringing at least the second wall (8) of a second material with a high thermal conductivity of said reaction vessels (2) in contact with each of said thermal blocks (14-19),
  wherein a data processing unit with software for dedicated data reduction for said detecting and/or quantitating of said analyte or analytes and said data processing unit is arranged to control at least one temperature change of the reaction volume (4) from a preceding temperature to a target temperature according to the method of claim 1,
  wherein said second wall (8) is arranged to be brought into direct contact with said first and said second thermal block (14-19), and
  wherein said reaction vessel (2) further comprises an expansion volume (14) in communication with an outlet (12) of said reaction vessel (2) and said reaction volume (4), for expansion of the sample and/or reagents when reacting and/or for accommodating vapor pressure created by heating.

10. The system according to claim 9 wherein the thermal conductivity of the second material is $\geq 10$ mW/mmK.

11. The system according to claim 10 wherein the second material of the second wall (8) is selected from the group consisting of metals.

12. The system according to claim 9 wherein the outer surface of the second wall (8) is flat.

13. The system according to claim 9 wherein the ratio of the area of the second wall (8) enclosing, i.e. the area of the second wall facing, the reaction volume (4) to the said volume is $\geq 0.5$ mm$^2$/µl.

14. The system according to claim 9 wherein the first wall (6) is permeable to visible and ultraviolet (UV) light.

15. The system according to claim 9 wherein the first material of the first wall (6) is selected from the group consisting of plastics or glasses.

16. The system (20) according to claim 9 wherein it comprises means (22) for bringing more than one wall (6, 8) of said reaction vessels (2) in direct contact with the thermal blocks (14-19).

17. The system (20) according to claim 9 further comprising means for pressing the wall or walls (6, 8) of said reaction vessel (2) and the wall or walls of the thermal blocks (14-19) in direct contact with each other against each other.

18. The system (20) according to claim 9 wherein the means (22) for bringing the wall or walls of the reaction vessel in direct contact with the thermal blocks (14-19) comprises a support (24) for said vessel (2) with means (22) for moving said support (24) in a circular or linear path and said thermal blocks (14-19) are at different points of said circular or linear path so that said wall (8) or walls (6, 8) of said reaction vessel (2) can be brought in direct contact with each thermal block (14-19) by moving said support (24) along said circular or linear path.

\* \* \* \* \*

SEQUENCE LISTING

<160> NUMBER OF SEQ ID NOS: 4

<210> SEQ ID NO 1
<211> LENGTH: 30
<212> TYPE: DNA
<213> ORGANISM: Artificial Sequence
<220> FEATURE:
<223> OTHER INFORMATION: primer

<400> SEQUENCE: 1
atgttccacg ctaaaagacc ttattgaaaa          30

```
<210> SEQ ID NO 2
<211> LENGTH: 28
<212> TYPE: DNA
<213> ORGANISM: Artificial Sequence
<220> FEATURE:
<223> OTHER INFORMATION: primer

<400> SEQUENCE: 2
cagcagaatg aaccgaatcc acaaatat                                          28

<210> SEQ ID NO 3
<211> LENGTH: 31
<212> TYPE: DNA
<213> ORGANISM: Artificial Sequence
<220> FEATURE:
<223> OTHER INFORMATION: probe

<400> SEQUENCE: 3
attattcatc accgagcgac tattcaagat a                                      31

<210> SEQ ID NO 4
<211> LENGTH: 17
<212> TYPE: DNA
<213> ORGANISM: Artificial Sequence
<220> FEATURE:
<223> OTHER INFORMATION: quencher probe

<400> SEQUENCE: 4
gctcggtgat gaataat                                                      17
```